United States Patent Office 3,419,047
Patented Dec. 31, 1968

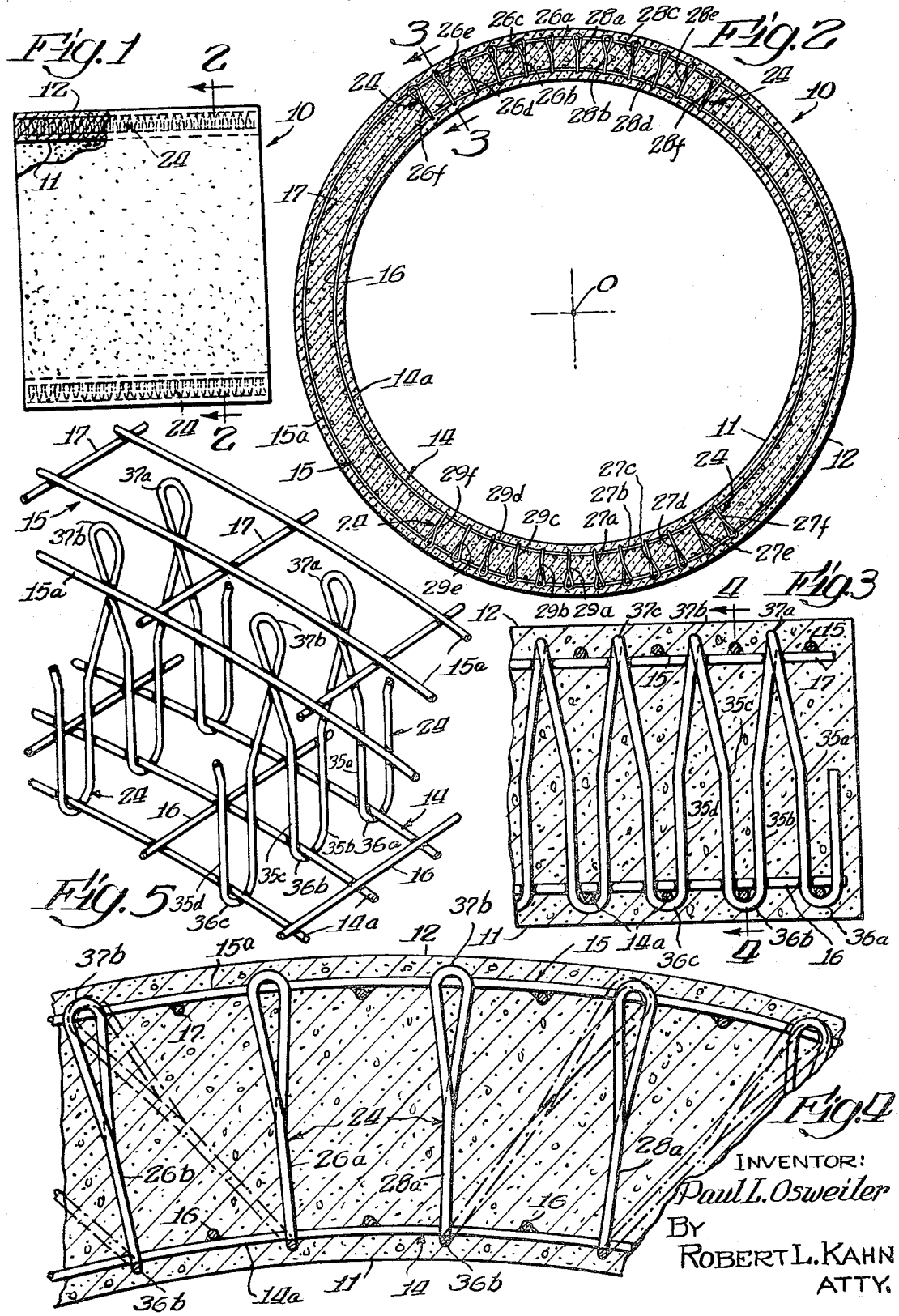

3,419,047
REINFORCED CONCRETE PIPE
Paul L. Osweiler, Dayton, Ohio, assignor to Price Brothers Company, Dayton, Ohio, a corporation of Michigan
Filed Mar. 15, 1967, Ser. No. 623,392
8 Claims. (Cl. 138—175)

ABSTRACT OF THE DISCLOSURE

Reinforced concrete pipe having concentric steel cages is provided with steel stirrups extending from the inner cage outwardly beyond the outer cage over limited arcuate regions at the crown and invert. These stirrups extend at spaced intervals along the length of the pipe and each stirrup has the outer loop portion twisted so that the outer loop of a stirrup can pass between adjacent coils of the outer cage without interference. The invention here is an improvement upon earlier applications where stirrups stop short of the outer cage to permit the outer cage to be positioned over the inner cage and stirrup assembly. The reinforcing action of the new stirrups is enhanced over the earlier stirrup arrangement. The stirrups cannot be assembled on the inner cage unless the outer cage is in position about the inner cage. Thus, a stirrup will have to be handled on an individual basis and welded in position.

Specification

This invention relates to reinforced concrete pipe and, in particular, to large diameter concrete pipe ranging in size up from about 48 inches in diameter and, in particular to pipe having diameters of about 120 inches and up. The pipe embodying the present invention is provided with steel reinforcement for the purpose of resisting external loading (trench loading) but otherwise is not adapted for handling fluids under pressure. Pipes for handling the latter are generally designated as pressure pipe and are pre-stressed with tensioned steel reinforcement. The pipe embodying the present invention does not have any pre-stressing and is generally used for sewer and culvert purposes. The invention to be hereinafter described is an improvement upon the reinforced concrete pipe disclosed and claimed in the prior co-pending applications Ser. Nos. 561,272 and 561,150 filed June 28, 1966, having a common assignee with the present application.

The applications referred to above disclose concrete pipe having concentric inner and outer steel cages normally disposed near the inner and outer concrete pipe walls. As more fully disclosed in said applications, the reinforced concrete pipe to which the present invention and the invention disclosed in the co-pending applications relate are usually buried in the ground and subject to external loads. The cages are disposed within the concrete pipe about one inch from the inner and outer pipe surfaces respectively. Such concrete pipe will have wall thicknesses ranging from about 5 inches to as much as 12 inches and up.

Such reinforced pipe normally is subject to forces tending to deform the pipe into a generally elliptical shape whose major axis (spring line) is horizontal and whose minor axis (extending between crown and invert) is vertical. This type of loading puts inner cage portions in tension at the crown and invert regions. As the result of such tension, the arcuate steel cage portions tend to straighten and create tension forces in the concrete.

As disclosed in the applications referred to above, steel stirrups locked and secured to the inner cage extend outwardly to the outer cage. Such steel stirrups are provided over limited angular extents at the crown and invert portions of the pipe. The steel making up two stirrups is bonded to the concrete and provides reinforcement tending to prevent the steel of the inner cage at the crown and invert regions from straightening under tension.

The present invention which is an improvement upon the inventions disclosed in the applications referred to above provides a stirrup construction which permits stirrups to extend from the inner cage toward and beyond such outer cage. As a result of such extension of the stirrup portions beyond the outer cage, the reinforcing action of the stirrups is improved over pipe having stirrups as disclosed in such applications by stopping short of the outer cage.

The present invention makes possible a pipe structure wherein steel is used so efficiently that a pipe having excellent load resisting characteristics and minimum steel may be fabricated. The invention is best described in connection with the drawings wherein FIG. 1 is a longitudinal section of a pipe embodying the present invention.

FIG. 2 is an enlarged section on line 2—2 of FIG. 1.
FIG. 3 is a sectional detail along line 3—3 of FIG. 2.
FIG. 4 is a sectional detail along line 4—4 of FIG. 3, FIG. 4 also showing in dotted lines a modification.
FIG. 5 is a perspective detail of a part of the steel reinforcing structure embodying the present invention, the concrete being removed for ease of illustration.

Referring first to FIGS. 1 to 5 inclusive, concrete pipe 10 has inner and outer walls 11 and 12 respectively. Pipe 10 may have a length generally of the order of 6 or 8 feet, or even less in larger diameters, and will have an inside diameter of at least about 4 feet and more often a diameter ranging from about 6 feet and up. With increasing pipe diameter, the advantages of the invention are greater. The wall thickness of the concrete pipe between inner and outer surfaces 11 and 12 will be at least about 5 inches and will range up to 12 inches and even more.

Pipe 10 has inner cage 14 and outer cage 15 of steel. Each cage may have a continuous helix or separate circular coils 14a and 15a respectively. Adjacent coils of a cage are retained in fixed relative position by longitudinal steel rods 16 and 17 for inner and outer cages respectively. The gauge of rods for the coils of each cage and spacing between coils and rods will be determined by load requirements for a pipe. Inasmuch as the same diameter pipe may be designed for different loads, it is possible for pipes having the same inside (or outside) diameters to have inner and outer cages of different gauges of steel and have the coils at different distances from each other and have the longitudinal rods 16 and 17 also at different distances from each other. The number of cage coils per foot length of pipe and the number of longitudinal rods (amount of steel) will depend upon design objective.

In general, even with the invention herein disclosed, conventional engineering analysis can be used for determining stresses to be encountered in the pipe and amount of steel required. It is understood that each cage 14 and 15 will have the rods and coils welded together as illustrated to form conventional cage structures. In accordance with general practice, the inner and outer cages will be located substantially about one inch from the inside and outside pipe walls. In some instances, the spacing between a cage and adjacent pipe wall may be increased.

In accordance with the present invention, stirrups 24 are provided. Stirrups are provided in two groups at angularly limited regions at the crown and invert portions of the pipe. The angle subtended from pipe axis 0 by each group of stirrups will be between about 60 and about 70 degrees for both the crown and invert. In some instances, the angle subtended by one or both groups of stirrups may depart somewhat from this range. However, best results are obtained within this general range.

Stirrups 24 are disposed at spaced intervals in two groups at the top and bottom (crown and invert) portions of the pipe. In general, stirrups may be disposed at the crown and invert along the bisecting vertical diametral plane of the pipe when laid or not as desired. It is not essential that stirrups along the vertical diametral plane of the pipe be provided. Stirrups 26a to 26f inclusive are provided at the crown on one side of the bisecting plane of the pipe and corresponding stirrups 29a to 29f are provided at the same side of the bisecting plane at the invert portion of the pipe. Stirrups 28a to 28f inclusive and 27a to 27f inclusive for the top and bottom portions of the pipe are disposed on the other side of the bisecting plane of the pipe.

The number and spacing (both angular and along the pipe length) of stirrups will depend upon the load characteristics of the pipe and will be so selected as to meet certain requirements. The number of stirrups shown here is by way of example only. It has been determined that adjacent stirrups in a group may have a space between them of about ¾ of the difference between the pipe wall thickness and 1.5 all in inches. Thus, for a 7 inch pipe wall, the spacing between adjacent stirrups will be 7 less 1.5 times ¾, or about 4.2 inches. This spacing arrangement provides the most efficient use of steel and generally prevents substantial cracks from appearing between stirrups.

Referring now to FIGURES 3, 4 and 5, stirrup 24 consists of a sinuous length of steel rod having generally radially extending portions 35a, 35b, 35c, etc. with interconnected inner (when in a pipe wall) bights or loops 36a, etc. at inner cage tangent cylindrical surface and outer loops 37a, etc. at outer tangent cylindrical surface. Stirrup 24 has 36 series of inner loops threaded about adjacent coils 14a of inner cage 14. Each stirrup loop enfolds an inner cage coil. While an inner stirrup loop may be welded to every cage coil enfolded, it is possible to omit welding occasionally and make the welds at about 12 or 16 inch intervals along the length of the cage. Thus, a cage having a length of say 6 feet may have stirrups welded at the cage ends and have about four additional welds spaced at intervals where cage coils are enfolded. No great precision is necessary since it is only necessary to insure proper stirrup orientation. The maximum spacing between welds of about 16 inches is not an absolute requirement and will be modified when a cage coil is encountered. In case of doubt, a closer weld spacing can be provided. Each stirrup has the body extending longitudinally parallel to the cage axis.

The outer 37 series of stirrup loops are each twisted 90 degrees with respect to the adjacent inner loops. With the outer loops twisted, it is possible to have them disposed between adjacent circumferential outer cage coils 15a. Each outer loop extends not only into the outer cage region between adjacent outer cage coils but preferably extends a short distance beyond the outer cage. As an example, each outer loop may extend for about ¼ inch beyond the coils of the outer cage, assuming that the outer cage is spaced about one inch from the outer pipe wall. If the outer pipe wall is more than one inch from the nearest part of the outer cage, then the twisted outer stirrup loops may extend beyond the outer cage even more. In general, however, the metal of the outer stirrup loop should be no closer than about between ½ inch and ¾ inch from the outer wall of the pipe.

If necessary, a twisted outer loop may be bent to avoid a coil of the outer cage. It is not essential that the coils of the inner cage register with the coils of the outer cage. The spacing between adjacent coils in the two cages will be determined by design requirements and even if both cages have the same number of coils for a pipe length, there is no necessity for having any registration between the coils in the two cages.

Each stirrup in the form described need only extend radially outwardly as viewed along the pipe axis. While it is preferred to have the stirrup loops extend normal to the pipe axis, some departure from this can be tolerated where a stirrup loop may tilt toward one pipe end or the other end. No attempt has been made to show accurate proportions in the drawings.

As disclosed in the applications previously identified, the free un-anchored ends of the stirrup loops provide decided advantages. The increased length of steel of stirrup bonded in the concrete provides increased reinforcement against the tendency of the inner cage steel portions at the crown and invert to straighten out. The reinforcing action due to the long stirrups extending beyond the outer cage is greater than is true of the stirrups extending toward but stopping short of the outer cage as is true in the applications identified above.

The stirrups required for the new pipe may be manufactured in endless strip form. This will include not only making the zigzag construction having inner and outer loops but will also include twisting the outer loops. The twisting of the outer loops may be gradual and start from any distance from the inner loops. A convenient arrangement will have the twisted outer loop portions gradually extended insofar as twisting is concerned toward a region about midway between the inner and outer loops.

Due to the length of the stirrup loops, it will be necessary to dispose the inner and outer cages in concentric relation preparatory to positioning the stirrups. This has been standard practice in casting pipe having two cages. With the two cages retained by suitable jigs, a workman can take a length of stirrup (the length of the stirrup body will be equal to the length of the pipe to be cast) and thread the loop portions in position. Inasmuch as the inner loops must go around the inside of the inner cage coils, the simplest provision will be to start a stirrup by first disposing a length of stirrup at the inside of the inner cage. Then a stirrup may be manipulated so that adjacent outer loops are guided through inner cage coils and toward and through coils of the outer cage. The stirrups are flexible enough to permit manipulation and at suitable intervals, welding of the inner loops to the inner cage coils may be accomplished. Such welding will serve to anchor a stirrup in position. Suitable jigs or clips may be used to maintain the outer loops in desired radial position between the coils of the outer cage. If necessary, soft iron wire may be used to temporarily tie the outer loops in desired angular position.

The savings in steel accomplished by the stirrup construction disclosed in the applications referred to above will be carried over into the corresponding structures disclosed herein wherein the stirrups reach beyond the outer cage.

Instead of having the stirrup loops extend radially outwardly from the inner cage, it is possible to utilize the invention disclosed in the prior application, Ser. No. 561,150 previously identified, and have the stirrup loops as shown in dotted lines extend from the inner cage at an angle of about between 35 and 45 degrees to the radius from the pipe axis at the inner cage where the stirrup loops are disposed. As is more fully disclosed in the prior application referred to, the slope of a stirrup loop is away from the vertical plane bisecting the pipe section transverse to the length of the pipe. By having a stirrup extending at an angle rather than radially, the formation of cracks in the concrete and particularly the extension of any small cracks is substantially inhibited.

What is claimed is:

1. A concrete pipe having a substantially uniform wall thickness of at least about 5" and having inner and outer cylindrical surfaces with an inside diameter of at least of the order of about 4', said pipe having steel reinforcement in the form of concentric inner and outer cylindrical cages disposed respectively within the concrete adjacent the inner and outer pipe surfaces, said cages being co-axial with said pipe and having generally circular coils spaced longitudinally along the pipe, and additional steel reinforcement for the length of said pipe at two limited arcuate portions of the pipe, said two arcuate portions being respectively at the crown and invert of said pipe when lying horizontal, said additional reinforcement being wholly within the pipe wall and bonded to the concrete and comprising a number of separate steel stirrups at each arcuate region, each stirrup being sinuous and, as viewed along a line normal to the pipe axis, extending longitudinally of the pipe with the sinuosity extending from the inner cage toward the outer cage, each sinuosity having the inner loop portion thereof lying generally in a plane bisecting the pipe and having the outer loop portion thereof twisted substantially 90 degrees to lie in a plane which is generally perpendicular to the pipe axis, each stirrup having each coil of the inner cage enfolded by a stirrup portion, each stirrup being welded to at least certain inner cage coils so that welds along one stirrup are not more than about 16" from each other as measured along the pipe length, the stirrup loops extending between coils of the outer cage cylinder beyond such outer cage cylinder a distance of about ¼ inch, said stirrups being disposed at angularly spaced intervals along said limited arcuate portions of said pipe and each arcuate portion subtending an angle of between about 60 degrees and about 70 degrees, the construction providing a reinforcement which is highly efficient for maximum strength with minimum steel.

2. The construction according to claim 1 wherein the spacing between adjacent stirrups is three-fourths of the figure obtained by subtracting 1.5 from the thickness of the pipe wall in inches.

3. The construction according to claim 1 wherein a stirrup has its loops extending substantially radially from the inner cage.

4. The construction according to claim 1 wherein a stirrup has its loops extending at an angle from the cylinder radius, said angle as viewed in transverse section being between about 35 degrees and about 45 degrees to a radius from the axis of the pipe and extending away from the plane bisecting the crown and invert regions.

5. For use in the manufacture of concrete pipe, whose inside diameter is at least about 4' with a wall thickness of at least about 5", a steel construction having inner and outer cylindrical steel cages, each cage having generally circular coils spaced longitudinally of the cage cylinder, and a plurality of steel stirrups disposed in two groups at diametrically opposed arcuate regions, defining the crown and invert regions in a finished pipe, each stirrup being sinuous and extending longitudinally of the cage cylinder, with the sinuosity extending outwardly from the inner cage toward the outer cage, each sinuosity having an inner loop portion which enfolds a coil of the inner cage so that a stirrup loops about each cage coil with the stirrup length extending along the cage length, a stirrup being welded to the inner cage at regions spaced no more than about 16" as measured along the length of a cage and each stirrup loop having the outer portion thereof twisted substantially 90° with respect to the inner loop portion so that each outer loop portion extending about ¼" beyond the outer cage, said cages and stirrups having their surfaces adapted for bonding to concrete when incorporated in concrete pipe, the stirrup groups each subtending a cylinder angle in the range of about 60 to about 70 degrees.

6. The construction according to claim 5 wherein each stirrup loop extends generally radially from the inner cage toward the outer cage.

7. The structure according to claim 5 wherein each stirrup loop extends outwardly but at an angle of between about 35 degrees and 45 degrees to a radius, the stirrup loops extending away from the plane bisecting the crown and invert regions.

8. For use in the manufacture of concrete pipe, whose inside diameter is at least about 4' with a wall thickness of at least about 5", said pipe having inner and outer steel cylinder cages for reinforcement, a steel stirrup construction consisting of a sinuous length of steel, each stirrup having each sinuosity consisting of a loop portion lying generally in one plane and an opposite loop portion twisted to lie in a different plane at substantially 90 degrees.

References Cited

UNITED STATES PATENTS

| 912,318 | 2/1909 | McMahon | 138—175 |
| 2,717,615 | 9/1955 | Peckworth | 138—175 |

HENRY S. JAUDON, *Primary Examiner.*